(12) United States Patent
Amey et al.

(10) Patent No.: US 10,864,474 B2
(45) Date of Patent: Dec. 15, 2020

(54) REINFORCED FILTRATION APPARATUS

(71) Applicant: Porvair Filtration Group Limited, Fareham (GB)

(72) Inventors: Chris Amey, Ashland, VA (US); Eric Duvekot, Ashland, VA (US); Paul Wilkinson, Fareham (GB); Alun Williams, Fareham (GB)

(73) Assignee: Porvair Filtration Group Limited, Fareham (GB)

( * ) Notice: Subject to any disclaimer, the term of this patent is extended or adjusted under 35 U.S.C. 154(b) by 344 days.

(21) Appl. No.: 15/901,208

(22) Filed: Feb. 21, 2018

(65) Prior Publication Data
US 2018/0236393 A1 Aug. 23, 2018

Related U.S. Application Data

(60) Provisional application No. 62/461,557, filed on Feb. 21, 2017.

(51) Int. Cl.
*B01D 53/02* (2006.01)
*B01D 46/52* (2006.01)

(52) U.S. Cl.
CPC ........ *B01D 46/523* (2013.01); *B01D 2265/06* (2013.01)

(58) Field of Classification Search
CPC .......................... B01D 2265/06; B01D 46/523
See application file for complete search history.

(56) References Cited

U.S. PATENT DOCUMENTS

| | | | |
|---|---|---|---|
| 4,728,426 A | 3/1988 | Rudinger et al. | |
| 5,436,216 A | 7/1995 | Toyao et al. | |
| 6,045,597 A * | 4/2000 | Choi ............... | B01D 29/012 55/483 |
| 2004/0221572 A1 | 11/2004 | Treiber | |
| 2006/0236684 A1 | 10/2006 | Zhang et al. | |
| 2007/0240406 A1 | 10/2007 | Zhang et al. | |
| 2010/0032365 A1 | 2/2010 | Moe et al. | |
| 2013/0152530 A1 | 6/2013 | Rolle et al. | |

FOREIGN PATENT DOCUMENTS

| | | |
|---|---|---|
| EP | 1048827 | 11/2000 |
| GB | 1032742 | 6/1966 |
| GB | 1501381 | 2/1978 |
| WO | WO 2006/003984 | 1/2006 |

* cited by examiner

*Primary Examiner* — Christopher P Jones
(74) *Attorney, Agent, or Firm* — Hunton Andrews Kurth LLP

(57) ABSTRACT

An illustrative aspect of the invention provides a filtration apparatus comprising a filtration element having a plurality of filtration media sheets and at least one reinforcement element positioned intermediate adjacent filtration media sheets. The reinforcement element has a body that is formed from a planar member having a plurality of apertures to allow passage of fluid therethrough. At least a portion of a surface of the reinforcement element is in contact with one of the filtration media sheets. At least a portion of another surface of the reinforcement element is in contact with the other filtration media sheet. Each of these surface portions defines a plane that is parallel to the filtration media sheet with which the surface portion is in contact.

17 Claims, 10 Drawing Sheets

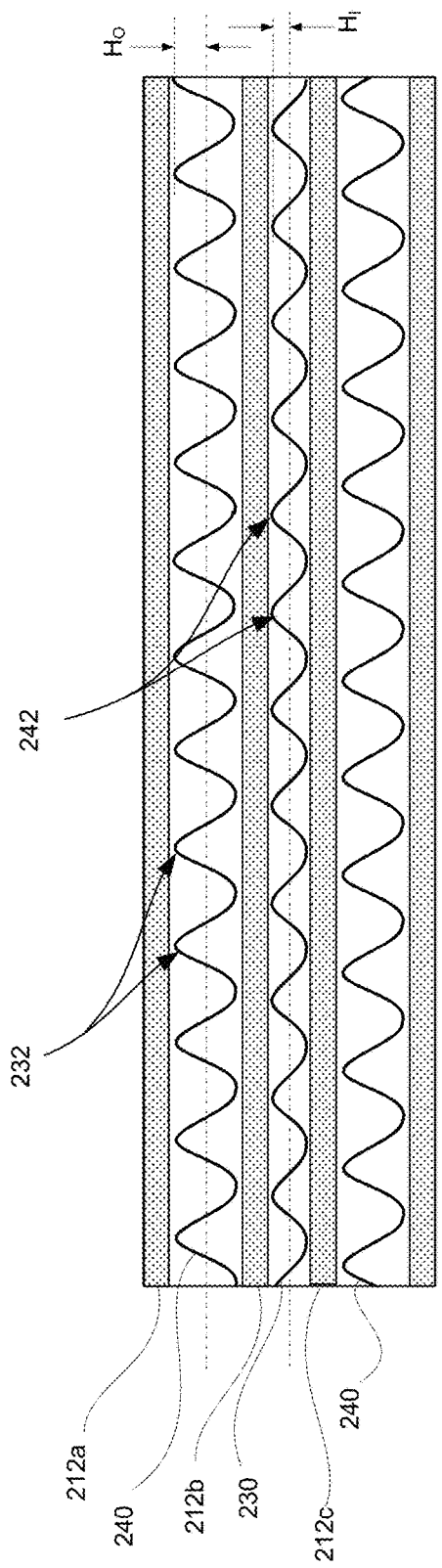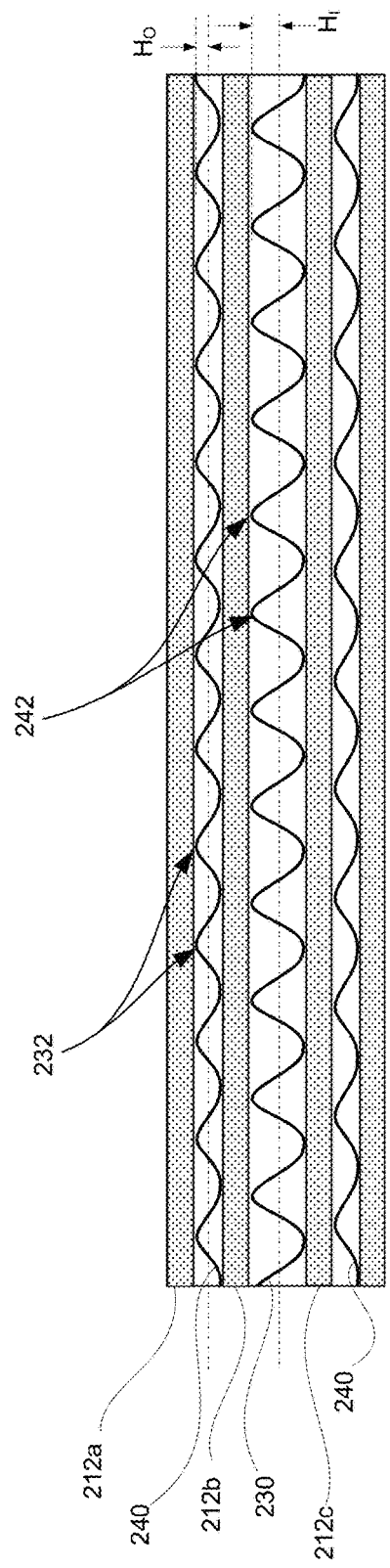

REINFORCED FILTRATION APPARATUS

This application claims priority to U.S. Provisional No. 62/461,557, filed Feb. 21, 2017, the complete disclosure of which is incorporated herein by reference.

BACKGROUND OF THE INVENTION

This application relates generally to filtration structures and, more particularly to filters having spacing and reinforcement structures between layers of filtration media.

High efficiency particulate air (HEPA) filters are critical components in ensuring safe barriers between contaminated zones and clean working environments within many business sectors including nuclear, bio-containment and pharmaceutical facilities.

HEPA filters are defined by the United States Department of Energy as filters which remove at least 99.97% of particles at 0.3 µm in diameter from air. HEPA filters typically comprise a plurality of filter elements, often with spacing devices in between the filter elements.

Functioning within air cleaning systems, HEPA filter packs may be formed and manipulated during manufacture using glass fiber media to produce a deep pleat structure for optimum space utilization. This construction and the fragile nature of the filter medium means they are inherently weak and can be prone to failure, even under normal operating conditions as a result of ballooning or swelling of pleats leading to rupture.

Given the criticality of the usage of HEPA filters and the requirement for additional safety margins when subject to up-set conditions more arduous than normal, high strength, robust HEPA filter units are a desirable product that can be utilized within critical flow streams.

It is known that the structural strength of deep-pleat HEPA filters is considerably improved by reinforcing the filter medium and increasing pack stability. This is normally achieved by utilizing corrugated separators inserted between both upstream and downstream pleat faces.

An example of a known filtration apparatus 10 is shown in FIGS. 1A and 1B. This filtration apparatus 10 comprises a pleated filter element 20 formed from a substantially planar filter medium. The planar filter medium is folded into a layered plurality of spaced apart sheets 22 joined by pleats 24. Reinforcement elements 30 are positioned in the spaces between sheets 22 to maintain the spacing therebetween. As shown in FIG. 2, the reinforcement elements 30 may be formed as monolithic corrugated sheets and are typically formed from relatively light-weight materials such as aluminum.

A problem with such filtration apparatus is that there is an inherent restriction of the flow of fluid through the apparatus. Because the reinforcement elements are impervious to fluid, fluids cannot pass through them. This results in substantially one dimensional flow through the filter. As shown in FIG. 1B, the filtration apparatus 10 may be positioned with an upstream or challenge plane 35 presented to upstream fluid flow 1. Flow through the filtration apparatus 10 is constrained by walls 40 of a housing or other structure to flow in an overall flow direction from the challenge plane 35 to the downstream or exit plane 37 of the filtration apparatus 10 where the fluid exits as downstream flow 5. It can be seen that the presence of the reinforcement elements 130 constrains internal fluid flow 3 to be within the porous filter elements and through the longitudinal channels 34 of the corrugated reinforcement elements 130. The result is that there can be little or no fluid flow across the sheets 22 of the filtration element 20 except near the entrance and exit planes 35, 37 of apparatus 10. The results is less flow across the filtration element sheets 22, which can result in greater pressure loss and lower filter performance.

While the illustrated filtration apparatus 10 is essentially a planar filter, similarly impervious reinforcement elements may be used between radially arranged filter elements in cylindrical filters. The result is obstruction of circumferential flow in such filters, which significantly reduces filtration performance.

In addition, the inclusion of an impervious reinforcement or spacing means provides additional risk of failure due to the possibility of tearing, cuts or impressions in the filter media during assembly. Recent published research suggests scrap rates often exceed 10% of batch construction following manufacture of typical deep pleated HEPA filter units—see "HEPA Filters for nuclear applications—Designs, qualification, manufacturing, inspection and testing", ATI Test Laboratory Report, November 2010.

SUMMARY OF THE INVENTION

An illustrative aspect of the invention provides a filtration apparatus comprising a filtration element having a plurality of planar, spaced apart filtration media sheets, and at least one reinforcement element positioned intermediate adjacent filtration media sheets. The at least one reinforcement element comprises a reinforcement element body formed from a planar member having a plurality of apertures to allow passage of fluid therethrough. At least a portion of a first surface of the at least one reinforcement element is in contact with a first sheet of the adjacent filtration media sheets and defines a first contact plane parallel to the first sheet. At least a portion of a second surface of the at least one reinforcement element is in contact with a second sheet of the adjacent filtration media sheets and defines a second contact plane parallel to the second sheet. In some embodiments, the reinforcement element body is corrugated with a first plurality of parallel ridges extending orthogonally away from a reinforcement element centerplane in a first direction and a second plurality of parallel ridges extending from the reinforcement element centerplane in a second direction opposite the first direction. Each ridge of the first and second plurality of ridges has an apex at a ridge height distance from the centerplane. The apexes of the first plurality of ridges collectively define the first contact plane and the apexes of the second plurality of ridges collectively define the second contact plane.

Another illustrative aspect of the invention provides a filter reinforcement element for use in conjunction with a pleated filtration element having a plurality of planar, spaced apart filtration media sheets. The filter reinforcement element comprises a reinforcement element body positionable between adjacent filtration media sheets of the pleated filtration element. The reinforcement element body is formed from a planar member having a plurality of apertures formed therethrough. At least a portion of a first surface of the reinforcement element body is configured so that when the reinforcement body is positioned between the adjacent filtration media sheets, the at least a portion of the first surface is in contact with a first sheet of the adjacent filtration media sheets and defines a first contact plane parallel to the first sheet. At least a portion of a second surface of the reinforcement element body is configured so that when the reinforcement body is positioned between the adjacent filtration media sheets, the at least a portion of the second surface is in contact with a second sheet of the adjacent filtration media sheets and defines a second contact plane parallel to the second sheet.

BRIEF DESCRIPTION OF THE DRAWINGS

The invention can be more fully understood by reading the following detailed description together with the accompanying drawings, in which like reference indicators are used to designate like elements, and in which:

FIG. 9 is a section view of a portion of a portion of the filtration apparatus of FIG. 7; and FIG. 10 is a section view of a portion of a portion of the filtration apparatus of FIG. 7.

DETAILED DESCRIPTION OF THE INVENTION

The present invention provides filtration apparatus having a plurality of planar-faced filter elements with permeable reinforcement elements disposed between the filter elements. It has been found that incorporation of highly permeable structures as reinforcement elements can reduce or eliminate the inhibition of two dimensional flow through the apparatus while maintaining sufficient mechanical strength to prevent collapse of the filter elements. Filtration apparatus according to the invention also exhibit reduced differential pressure loss compared with identical filtration apparatus using fluid-impervious separators. This is of significant importance in the filtration field, as flow restriction and lifetime before filter change are important factors in determining pumping and maintenance. Accordingly, filtration apparatus according to the invention have the potential to offer significant cost savings in comparison with previously known filtration apparatus.

Figure 1A:
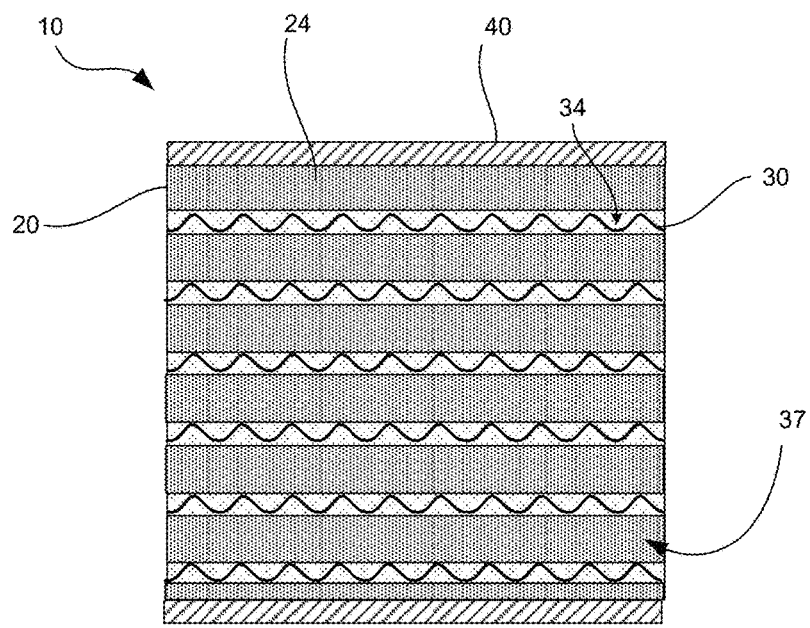
FIG. 1A is an end view of a prior art filtration apparatus.
Figure 1B:
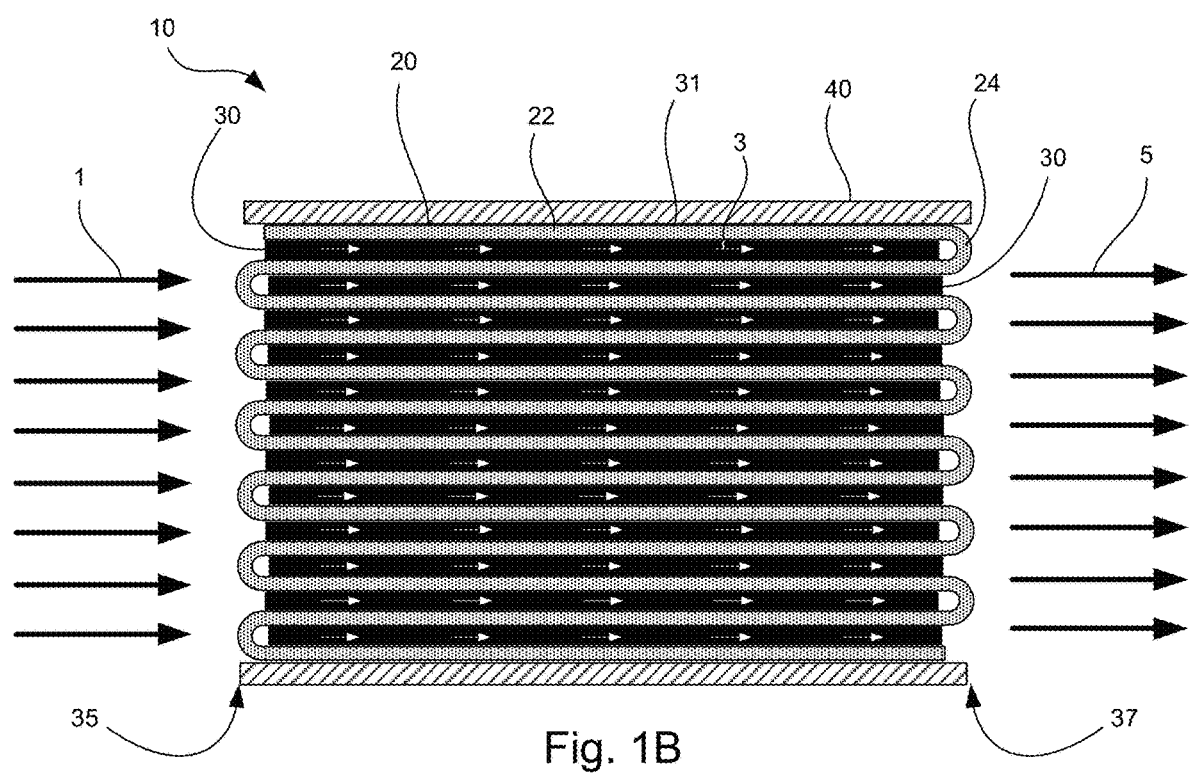
FIG. 1B is a side view of the prior art filtration apparatus of FIG. 1A.
Figure 2:
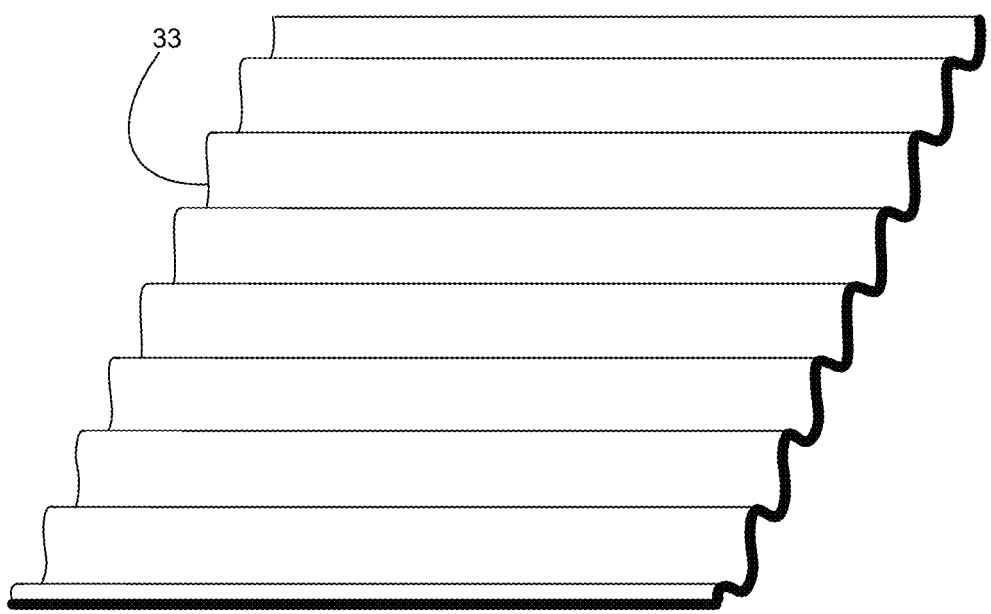
FIG. 2 is a perspective view of a prior art filter reinforcement element.
Figure 3A:
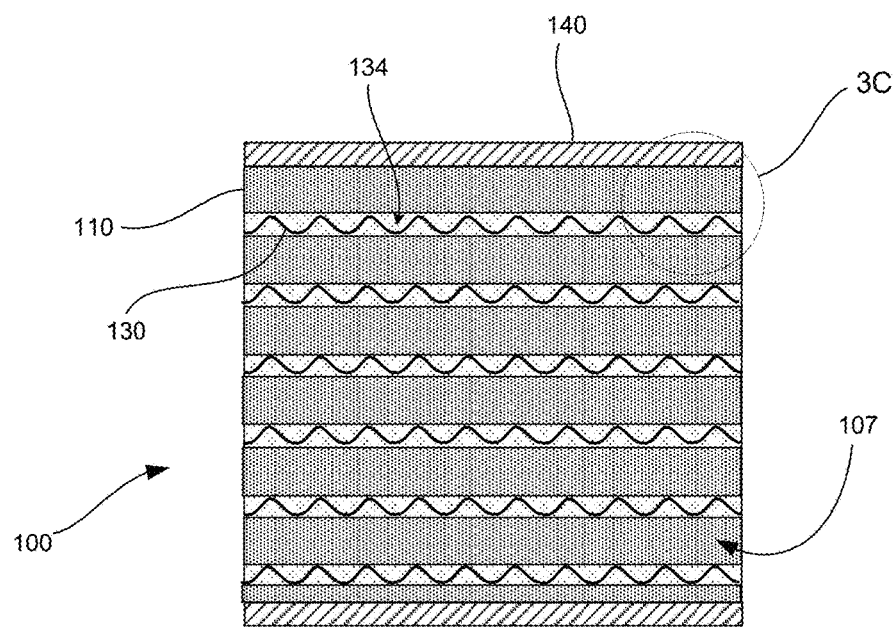
FIG. 3A is an end view of a filtration apparatus according to an embodiment of the invention.
Figure 3B:
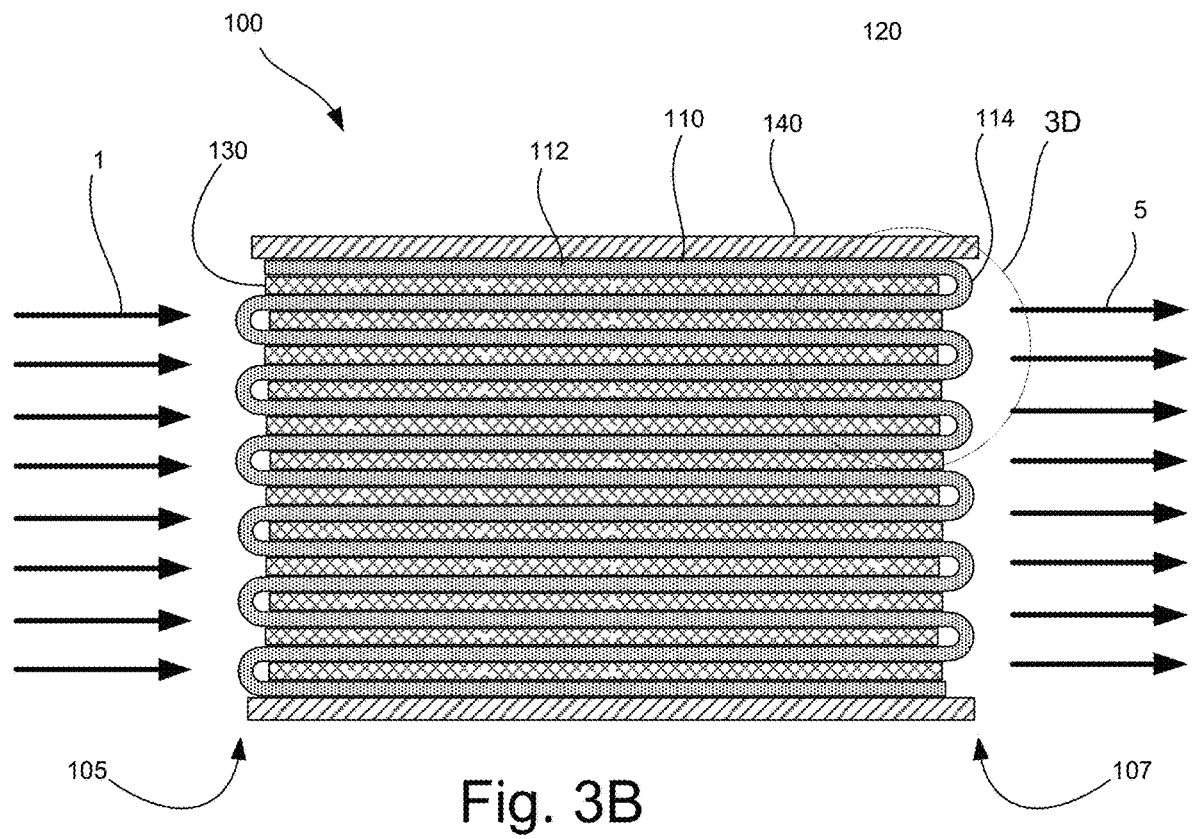
FIG. 3B is side view of the filtration apparatus of FIG. 3A.
Figure 3C:
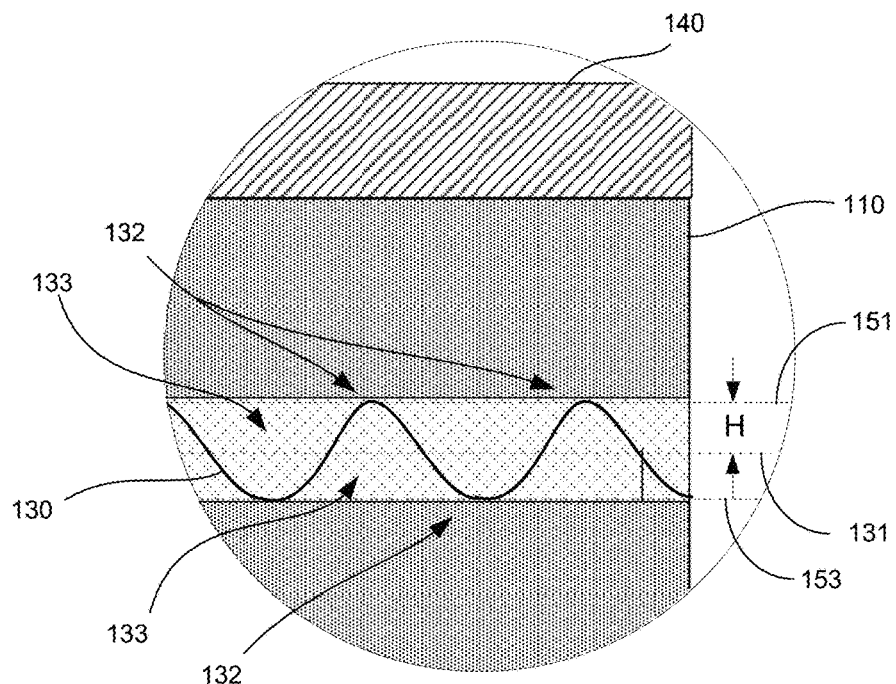
FIG. 3C is an enlarged view of a portion of the filtration apparatus of FIG. 3A.
Figure 3D:
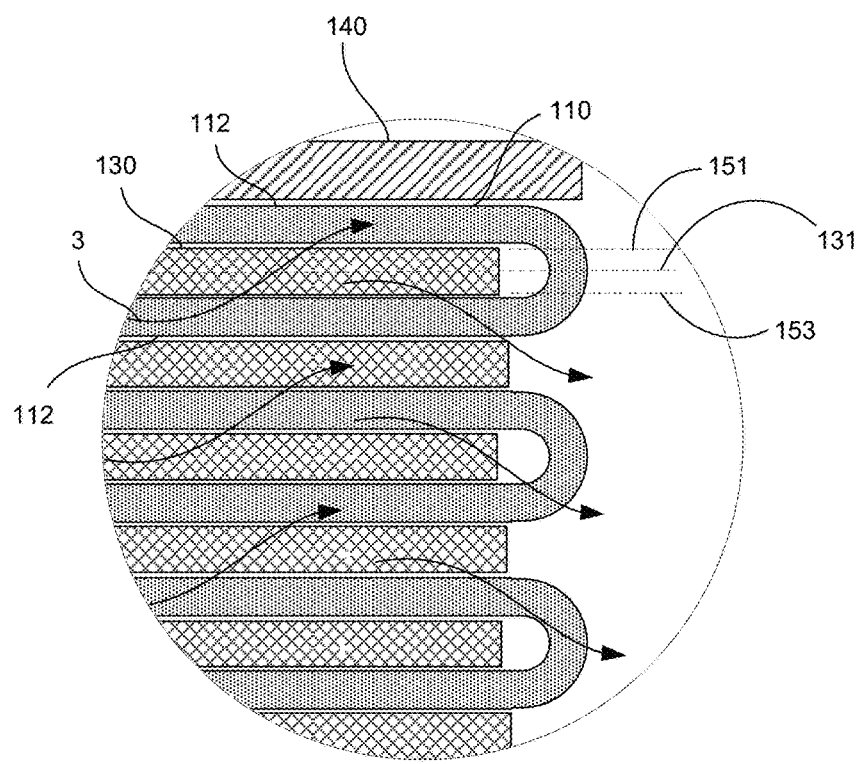
FIG. 3D is an enlarged view of a portion of the filtration apparatus of FIG. 3A.

With reference to FIGS. 3A-3C, an illustrative filtration apparatus 100 according to an embodiment of the invention has a pleated filtration element 110 similar to that of the prior art filtration apparatus 10 of FIGS. 1A and 1B. Flow through the filtration apparatus 100 is constrained by walls 140 of a housing or other structure to flow in an overall flow direction from the challenge plane 105 to the downstream or exit plane 105 of the filtration apparatus 100 where the fluid exits as downstream flow 5. The pleated filter element 110 is formed from a planar filter medium folded into a layered plurality of spaced apart sheets 112. Each sheet 112 is joined to each subsequent sheet by a fold or pleat 114. In the illustrated embodiment, the sheets 112 of the filtration element 110 have substantially parallel planar surfaces and each element has a substantially constant thickness.

The filter medium of the pleated filtration element 110 may be made of any material that allows the filtration element 110 to separate a solid from a fluid. Examples of suitable materials conventionally used for filter elements include metals (such as those described and exemplified above in relation to the metals used to form the reinforcement element), polymers (such as those described and exemplified above in relation to the materials used to form the reinforcement element), and glass. Of particular use are metal, glass, or polymer fiber materials, which may be provided in woven or non-woven form.

Reinforcement elements 130 are positioned in the spaces between sheets 112 to maintain the spacing therebetween and to enhance the buckling and crush resistance of the filter element 110. The reinforcement elements 130 are sheet-like structures provided with apertures that collectively define an open area that allows a fluid to flow through the elements 130. In this specification the term "open area" means the cross-sectional area normal to the surface of the reinforcement element 130 through which fluid may pass. The size, shape and number of apertures may vary depending on the desired porosity and the material and configuration of the reinforcement element 130. The two dimensional porosity of a reinforcement element 130 is the ratio (which may expressed as a percentage) of the open area to the total cross-sectional area normal to the surface of the reinforcement element 130.

The reinforcement element 130 may be formed from any rigid or semi-rigid material that can be formed with open areas sufficient to provide the desired porosity. The reinforcement elements 130 can also be formed as a monolithic sheet that is then drilled or punched to produce the open areas. As will be discussed in more detail below, the reinforcement element 130 may also be formed as a mesh having the desired porosity.

The reinforcement element 130 may be made from any material having the necessary strength to act as a spacing material to maintain the spacing of the filter element sheets 112 and resist compression or crushing even with the open areas through the element 130. Examples of suitable materials include metals (which may be pure metals or alloys), ceramics, or organic or inorganic polymers.

In some embodiments, the reinforcement element 130 comprises or is formed from a pure metal. Examples of usable pure metals include a transition metal such as scandium, titanium, vanadium, chromium, manganese, iron, cobalt, yttrium, zirconium, niobium, molybdenum, technetium, ruthenium, rhodium, palladium, cadmium, hafnium, tantalum, tungsten, rhenium, osmium, iridium, platinum; a lanthanide, such as lanthanum, cerium, praseodymium, neodymium, promethium, samarium, europium, gadolinium, terbium, dysprosium, holmium, erbium, thulium, ytterbium and lutetium; or a p-block metal such as aluminum, gallium, indium, or tin.

In some embodiments, the reinforcement element 130 comprises or is formed an alloy. The alloy used may comprise iron and chromium. Exemplary usable alloys include an alloy of iron, chromium and nickel and an alloy of iron, chromium, nickel and molybdenum. When the alloy contains iron, the iron typically comprises at least 0.5%, such as at least 1%, such as at least 1.5%, such as at least 2%, such as at least 3%, such as at least 5%, such as at least 10%, such as at least 15%, such as at least 20%, such as at least 25%, such as at least 30%, such as at least 35%, such as at least 40%, such as at least 45%, such as at least 50%, such as at least 55%, such as at least 60%, such as at least 65%, such as at least 70%, of the alloy. The iron typically comprises up to 95%, such as up to 90%, such as up to 80%, such as up to 75%, such as up to 70%, such as up to 65%, such as up to 60%, such as up to 55%, such as up to 50%, such as up to 45%, such as up to 40%, such as up to 35%, such as up to 30%, such as up to 25%, such as up to 20%, such as up to 15%, such as up to 10%, such as up to 5%, such as up to 3%, such as up to 2% of the alloy. These percentages are expressed by weight of the total weight of the alloy. When the alloy contains chromium, the chromium typically comprises at least 5%, such as at least 10%, such as 15%, such as at least 20%, such as at least 25%, of the alloy. The chromium typically comprises up to 35%, such as up to 30%, such as up to 25% of the alloy. These percentages are expressed by weight of the total weight of the alloy. When the alloy contains nickel, the nickel typically comprises at least 2%, such as at least 5%, such as at least 8% of the alloy. The nickel typically comprises up to 20%, such as up to 15%, such as up to 12%, of the alloy. These percentages are expressed by weight of the total weight of the alloy.

In particular embodiments, the reinforcement element 130 is formed from stainless steel. In this specification "stainless steel" is defined as an alloy comprising iron and chromium, and optionally nickel and/or molybdenum, containing at least 10.5% chromium by weight of the total weight of the alloy. It has been found by the present inventors that a stainless steel reinforcement element exhibits excellent mechanical strength, particularly against crushing. Particularly suitable forms of stainless steel include stainless steel 304/304L, containing 17.5-20% chromium and 9-11% nickel, and stainless steel 316/316L containing 16-18% chromium, 10-14% nickel and 2-3% molybdenum.

In some embodiments, the reinforcement element 130 comprises a ceramic material. Any chemical composition and form of ceramic material having sufficient mechanical strength may be used. Examples of usable ceramic materials include silicon dioxide ($SiO2$), aluminum oxide ($Al2O3$), zirconium oxide ($ZrO2$), iron oxide ($Fe2O3$), titanium dioxide ($TiO2$), calcium oxide (CaO), and magnesium oxide (MgO) or a combination of two or more of these materials.

In some embodiments, the reinforcement element 130 is formed from an organic polymer. Examples of particular classes of organic polymers suitable for use according to the present invention include polyolefins, substituted polyolefins, polyesters, polycarbonates, polyamides, polyimides, polyether sulfones, and mixtures or derivatives thereof. Examples of suitable polyolefins include, but are not limited to: polyethylenes; polypropylenes; poly(1-butene); poly(1-pentene); poly(1-hexene); poly(methyl pentene); polystyrene; and mixtures thereof. Examples of suitable substituted polyolefins include, but are not limited to: poly(vinylidene fluoride); poly(tetrafluoroethylene) (PTFE—Teflon®); poly(methyl methacrylate); and mixtures thereof.

As noted above, the reinforcement element 130 may be provided in any sheet-like form provided it has sufficient open area to allow fluid flow (especially air flow) to pass through it while maintaining sufficient mechanical strength to resist crushing and compression. In particularly suitable embodiments, the reinforcement element is formed as a mesh of fiber strands. In typical embodiments, the reinforcement element 130 is formed as a mesh of fibers having an average diameter in the range of 1-40 μm and a form that may be circular in cross section but can also be of an irregular cross section. Woven mesh suitably has an average wire diameter in the range of 10-300 μm and may be formed of various different weave patterns from complex Dutch twills to plain weave.

The mesh used in reinforcement elements 130 may be made from any material having the necessary strength. Examples of suitable materials include metals (which may be pure metals or alloys), ceramics, or organic or inorganic polymers, as described and exemplified above. Typically, the mesh is formed from connected strands of material, particularly ductile material, typically formed from wire. When the mesh is formed from wire, as is known to the skilled person, the wire gauge (i.e. the diameter of the wire used to form the mesh, and the inter-wire apertures which form the open area of the mesh) may vary depending on the open area required, the intended application, and the physical and mechanical properties required by that application.

In embodiments of the invention where a wire mesh is used to form the reinforcement elements 130, the wire diameter and spacing may be selected so as to produce a particular aperture size (and resultant porosity). In typical embodiments, the wire has a diameter in a range from 0.01 mm to 5 mm. In particular embodiments, the wire has a diameter in a range from 0.02 mm to 2.5 mm. In particularly suitable embodiments, the wire has a diameter in a range from 0.05 mm to 1 mm. In some embodiments, the wire has a diameter in a range from 0.1 mm to 0.5 mm. Typical apertures between the wires have an effective diameter from 0.05 mm to 10 mm. In illustrative embodiments, the apertures have effective diameters in a range from 0.1 mm to 5 mm. In particularly suitable embodiments, the apertures have effective diameters in a range from 0.2 mm to 2.5 mm. In a particular embodiment, the apertures have effective diameters in a range from 0.4 mm to 1 mm. A particularly preferred spacer mesh type is formed from wire having a diameter of 0.132 mm with inter-wire apertures of 0.503 mm, corresponding to 40×40×39 Standard Wire Gauge (swg).

The mesh may be formed by any means known to the skilled person, depending on the material from which it is formed. Typical means for forming mesh known to the skilled person include weaving, knitting, welding, extruding, expanding, etching and electroforming. Preferably the mesh is a woven mesh (i.e. a mesh produced by weaving).

In particular embodiments, the reinforcement element 130 is formed as a sintered, or diffusion-bonded metal mesh. It has been found that a sintered mesh promotes strength and durability of the reinforcement element 130, thereby allowing for high applied loads (the result of flow-induced pressure differentials) across the filtration medium surfaces without the undesired collapse of the filter elements and resultant reduction of effective filtration medium area. Sintered construction also minimizes the risk of damage to the filtration medium surfaces which may occur due to the presence of protruding features (i.e. loose wires) which could be encountered in the use of a non-sintered mesh element 30.

In filtration apparatus where the filter element sheets 112 are closely spaced the reinforcement elements 130 may be provided as substantially planar sheets. In embodiments where the spacing in between filter element sheets 112 is greater and/or where it is desirable to provide longitudinal channels 134 for fluid flow in between the filter element sheets 112, the reinforcement elements 130 may be corrugated as shown in FIG. 3A. As used herein, the term "corrugated" takes its normal meaning in the art as describing a structure having substantially parallel ridges and furrows. The precise form of the corrugations may vary depending on the application, the strength and other mechanical properties that the corrugated reinforcement element is required to have, and the filtration apparatus into which the corrugated reinforcement element is incorporated. Each corrugated reinforcement element 130 of the invention has regularly spaced and sized ridges or peaks 132 on both sides of a center plane 131 through the element 130. The regions between ridges 132 as viewed from one side of the element 130 may be referred to as valleys 133. In a prismatic or planar filtration apparatus 100, the height H of the ridges 132 may be constant along the longitudinal dimension of the reinforcement element 130. In some embodiments, however, the height H may decrease along the longitudinal dimension of the reinforcement element 130 to provide an effective taper of the reinforcement element 130. In either case, the apexes of the ridges 132 on one side of the element define a first contact plane 151 and the apexes of the ridges on the other side define a second contact plane 153.

In the reinforcement element 130 of the illustrated embodiment, the first and second contact planes 151, 153 are parallel. In tapered reinforcement elements, however, the contact planes 151, 153 would be at an angle relative to one another, the angle corresponding to the degree of taper. A small degree of taper incorporated into the reinforcement element 130 can be used to facilitate installation of the reinforcement element between the filtration element sheets 112 during manufacture. As will be discussed in more detail hereafter, a taper may be used in cylindrical filtration apparatus where the filtration element sheets 112 are not parallel to one another.

Corrugations are typically described by their pitch (i.e. the number of corrugations per unit length) and height. In typical embodiments, the corrugations of the reinforcement element 130 have a pitch in a range of 0.5 to 10 corrugations per cm. In certain embodiments, the corrugations of the reinforcement element 130 have a pitch in a range of 1 to 5 corrugations per cm. The corrugated mesh may have a pitch in the range of 3 to 4 corrugations per cm and in a particularly suitable embodiment, may be about 3.34 corrugations per cm (8.5 corrugations per inch).

The corrugation ridges 132 of reinforcement elements 130 according to some embodiments of the invention may have a height H in a range of 0.01 to 1 cm. In some embodiments, the corrugation peak height H may be in a range of 0.05 to 0.5 cm. The corrugation peak height H may be in a range of 0.1 to 0.2 cm, and in particularly suitable embodiments, may be about 0.168 cm (0.066 inch) or about 0.132 cm (0.052 inch).

The cross-sectional corrugated mesh may be formed into a wide variety of shapes depending on the particular application, and the filtration apparatus into which it is incorporated. Examples of suitable shapes include a sheet or a roll. In one embodiment, the corrugated mesh of the invention is wrapped around a polygonal or circular structure. The corrugations of the reinforced elements 130 may be produced when the sheets are formed or can be introduced into an already formed sheet.

Figure 4:
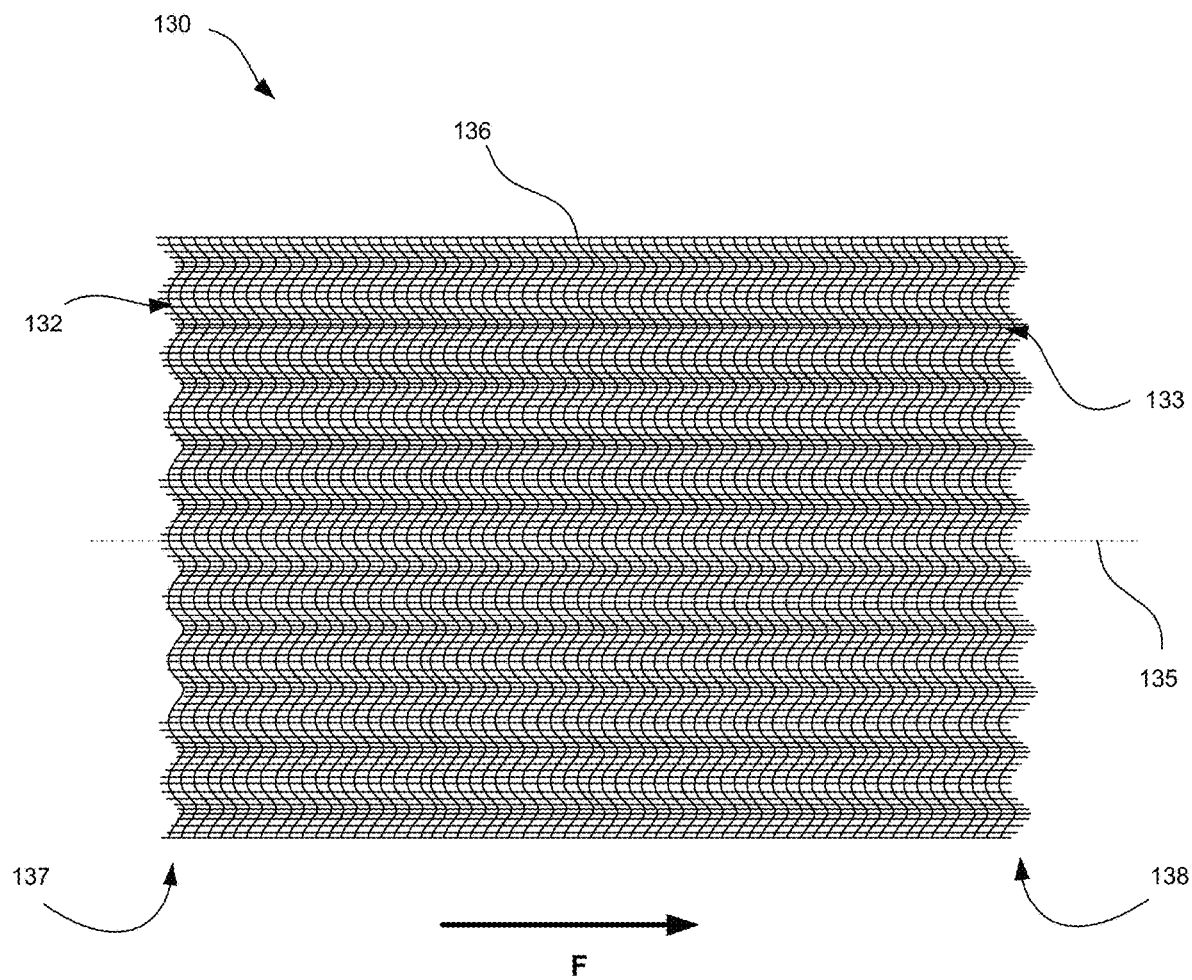
FIG. 4 is a perspective view of a corrugated mesh reinforcement element according to an embodiment of the invention.

In particularly preferred embodiments of the invention, the reinforcement element 130 comprises a corrugated wire mesh 136 as shown in FIG. 4. The peaks 132 and valleys 133 of the corrugated mesh are aligned with the longitudinal axis 135 of the reinforcement element center plane 131 and run from one edge (e.g., an upstream edge) 137 to an opposite edge (e.g., a downstream edge) 138. It will be understood that upstream and downstream are identified relative to a primary flow direction F through a filtration apparatus when the reinforcement element 130 is installed therein.

Figure 5:
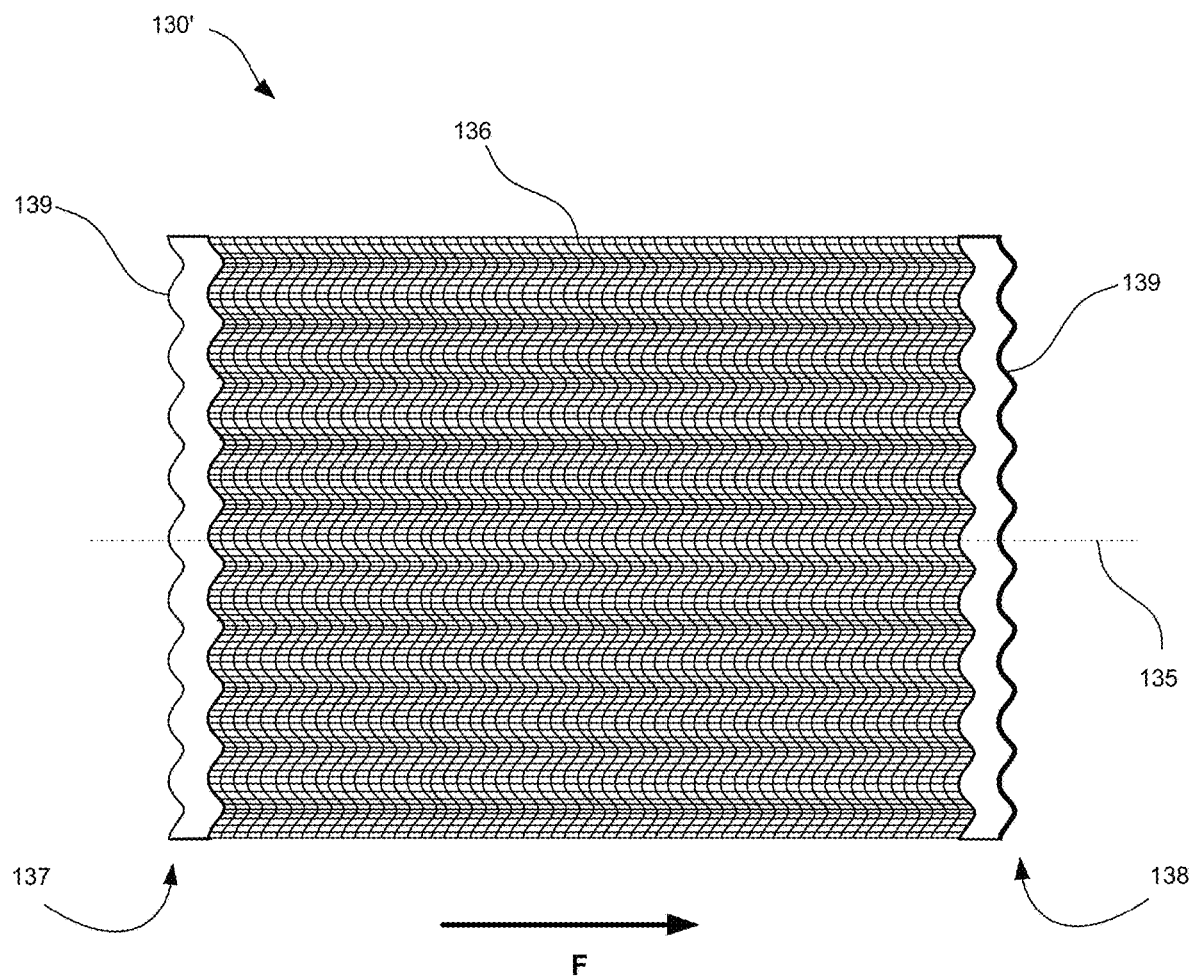
FIG. 5 is a perspective view of a corrugated mesh reinforcement element according to an embodiment of the invention.
Figure 6:
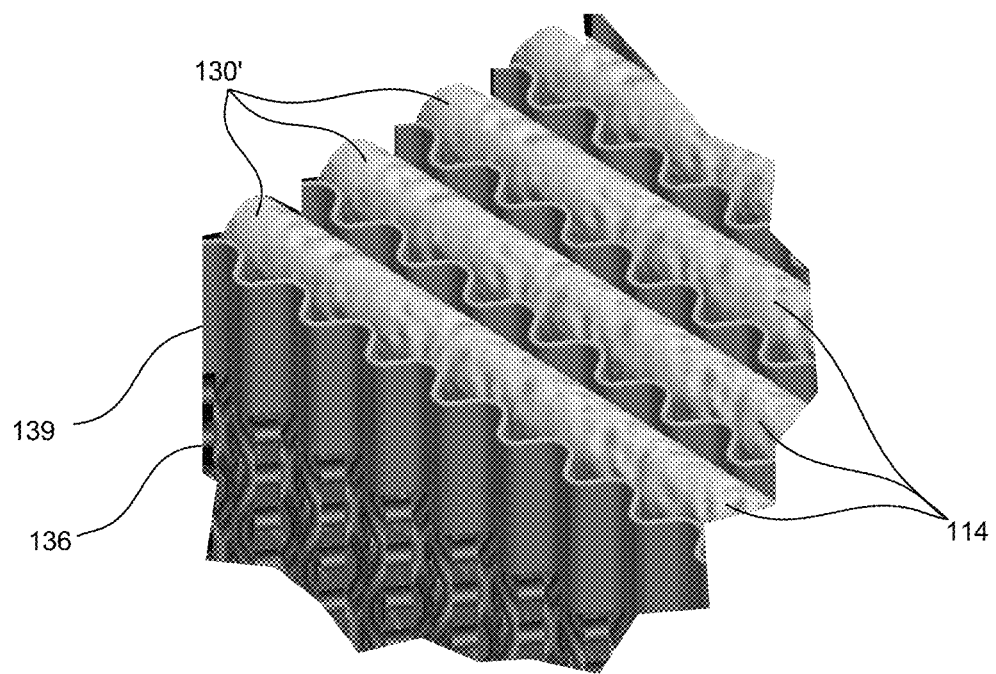
FIG. 6 is a perspective view of a portion of a filtration apparatus according to an embodiment of the invention.

A potential disadvantage of using a wire mesh for the reinforcement element 130 is that, during manufacture, particularly during the cutting and forming stages, deformed wires may contribute to a jagged edge profile. This presents a particular problem for a corrugated mesh to be incorporated into filtration apparatus as it adds significant risk of damage during assembly of the filtration apparatus, particularly when the filter elements are made of delicate materials such as fibers. FIGS. 5 and 6 illustrate an alternative reinforcement element 130' that addresses this problem. In this embodiment, the corrugated upstream and downstream edges 137, 138 of the reinforcement element 130' are replaced or encapsulated by an edge guard 139 (sometimes referred to as a shim). The edge guards 139 serve to reduce the risk of damage to the filtration medium surfaces during fabrication (i.e., when inserting the reinforcement elements 130 into the pleated filter medium 110) and/or during operation, especially at the location of the pleats 114 where the pleated medium 110 is folded to form the filter element sheets 112. It will be understood that while the reinforcement element 130' is shown with edge guards 139 on both upstream and downstream edges 137, 138, an edge guard 139 may be provided at only one of the two edges 137, 138. In some embodiments, for example, each reinforcement element 130 may have an edge guard 139 only at the edge to be inserted first into the space between filter sheets 112.

In some embodiments, the edge guard 139 may comprise a thin layer of material folded or otherwise formed to fit over and around the edges 137, 138 to encapsulate the mesh material. The material of the edge guard 139 may be selected so that the thin layer conforms closely to the shape of the mesh. This, in particular, allows the edge guard to take on the corrugations of the mesh 136 adjacent the edges 137, 138. Examples of suitable materials include metals (including those defined and exemplified above in relation to the reinforcement element), ceramics (including those defined and exemplified above in relation to the reinforcement element) or organic or inorganic polymers (including those defined and exemplified above in relation to the reinforcement element). In some embodiments, the edge guard 139 is formed from the same material as the mesh 136. In a particular embodiment, the edge guard 139 is formed from stainless steel (as defined above). It has been found by the present inventors that a stainless steel edge guard 139 exhibits excellent mechanical strength, particularly against crushing. Particularly preferred forms of stainless steel include stainless steel 304/304L/316/316L (as defined above).

The edge guards 139 may be bonded to the mesh 136 using any suitable method known in the art. In some embodiments, the edge guards 139 may be integrally formed with the mesh 136. In yet another embodiment, the edge guards 139 may be formed by folding the wire ends at the edges 137, 138.

In most embodiments, the edge guard 139 is corrugated so as to correspond with the corrugations of the mesh 136 and is impervious to fluid flow (i.e., has no open structure capable of allowing fluid to flow through it).

As has been discussed, the reinforcement elements 130 of the invention may be formed from pervious sheets or from mesh materials having apertures or open areas configured to provide a desired porosity. Regardless of the form in which the apertures and open areas are provided, the porosity of the reinforcement elements 130 may be selected based on various factors such as the particular flow application, the material and configuration of the filter elements being reinforced, the required mechanical strength needed for reinforcement, and the permitted air flow through the reinforcement element. In some embodiments, the porosity is in a range of 20% to 80%. Advantageously, the porosity is in a range of 40% to 70%. Even more advantageously, the porosity is in a range of 50% to 60%.

In embodiments of the invention where the reinforcement elements 130 comprise a corrugated mesh, the porosity of the mesh is typically in a range from 20% to 80%. In some embodiments, the porosity is in a range from 40% to 70%. In embodiments particularly suitable for HEPA filters, the porosity is in a range from 50% to 60%, preferably in a range 53% to 59%, and even more preferably 55% to 57%. It has been found that a corrugated mesh having a porosity in the foregoing ranges provides a suitable balance of the goals of maintaining airflow through the mesh and providing strength against crushing or compression. In a particular embodiment, the porosity is or about 56%.

In a particular exemplary embodiment, the reinforcement element 130 comprises a corrugated mesh manufactured from a sintered stainless steel woven mesh structure with approximately 56% porosity.

Heretofore, the invention has been discussed in the context of filter elements that are pleated to provide substantially parallel sheets of filter media. The invention also provides filtration elements in which the pleated sheets are not parallel to one another. A particular example of filtration elements are those configured for use in annular cylindrical filters where the overall fluid flow direction across the filter element is in a radial direction. In such filtration elements, some or all of the spaces between adjacent filter element sheets are V-shaped with the rounded point of the V formed by the pleat and the top of the V opening inward toward the center of the cylindrical filter or outward toward its circumference.

Figure 7:
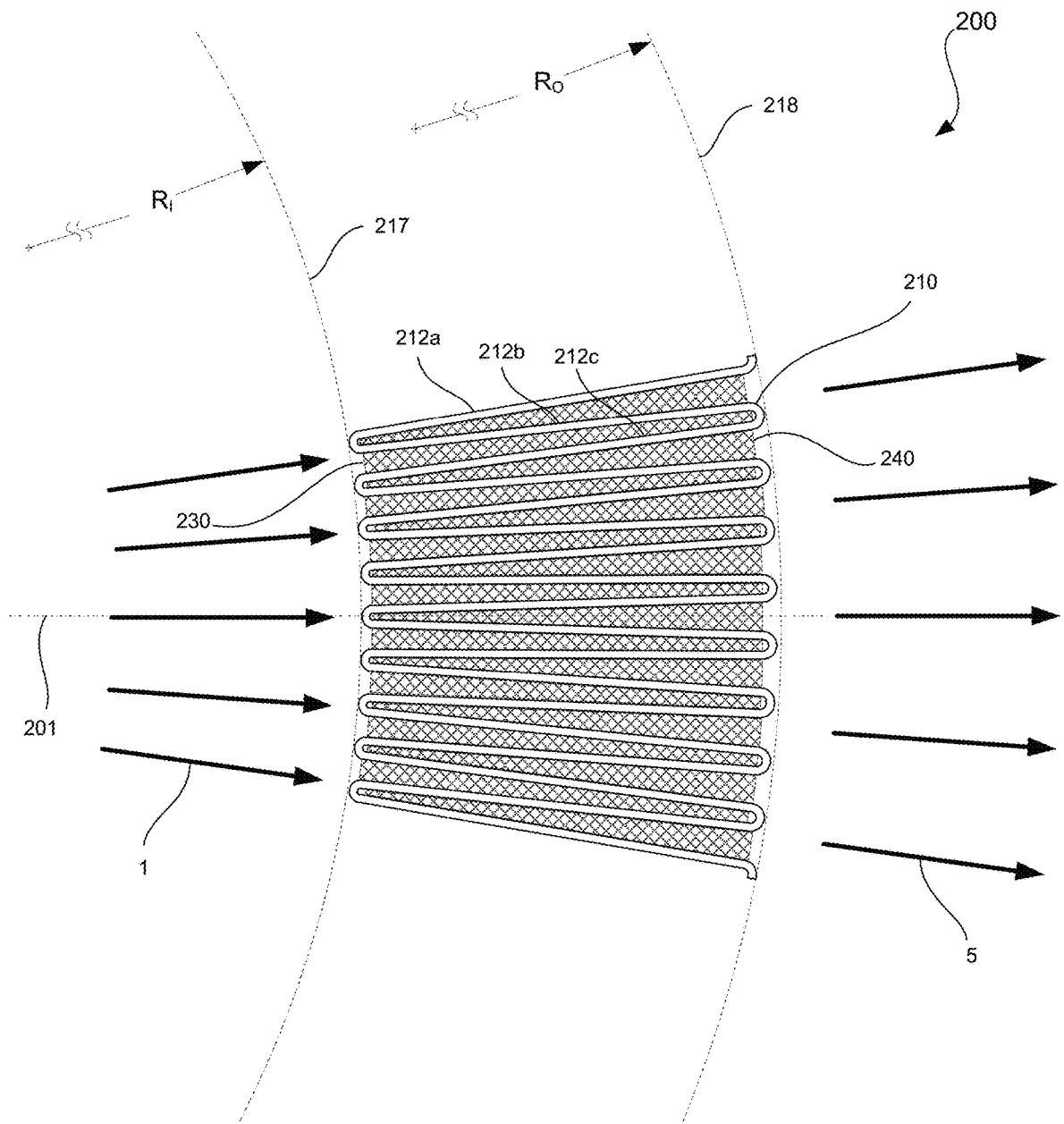
FIG. 7 is a partial end view of a cylindrical filter arrangement incorporating a filtration apparatus according to an embodiment of the invention.
Figure 8:
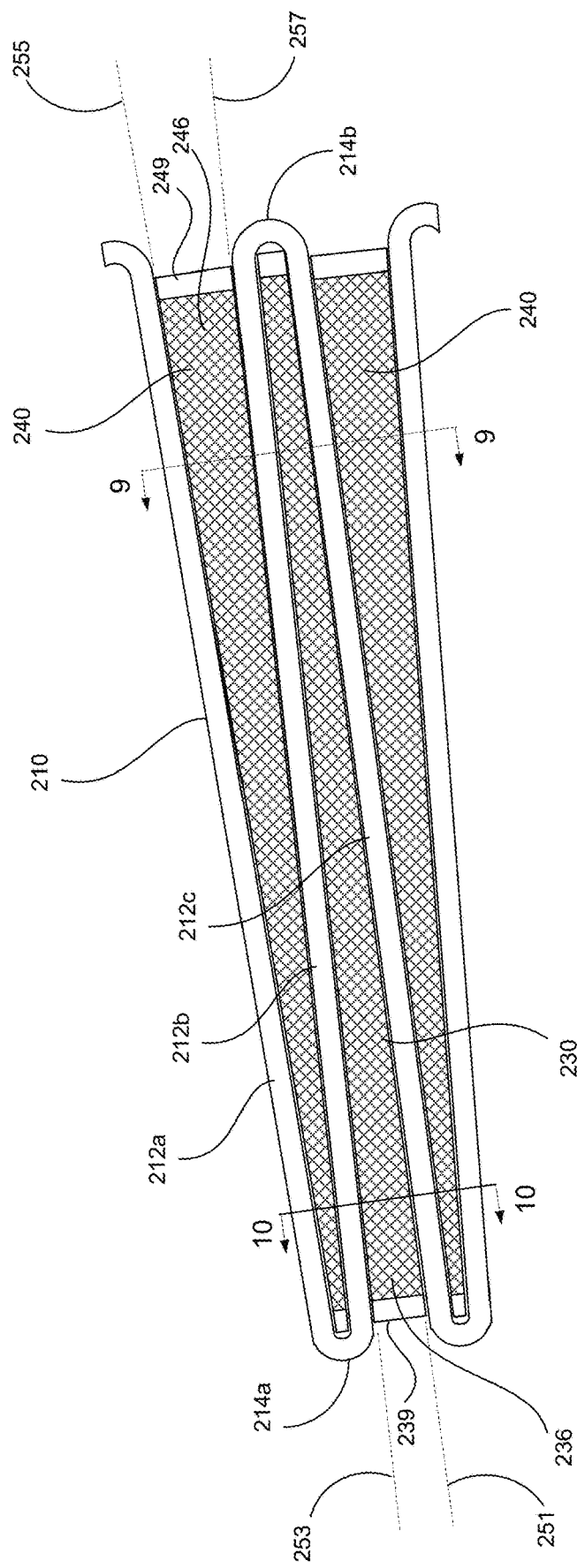
FIG. 8 is an enlarged view of a portion of the filtration apparatus of FIG. 7.

To maintain the above filter element configuration and prevent deformation of the planar filter elements, a reinforcing member may be provided that is formed with a structure that is tapered to correlate to the V-shaped volume between filter media sheets. FIG. 7 illustrates a portion of a cylindrical filter having a filtration apparatus 200 that comprises a pleated filtration element 210 and a plurality of reinforcement elements 230, 240. FIG. 8 is an enlarged illustration of a selected portion of the filtration apparatus 200. Fluid flow through the filtration apparatus 200 may be constrained so that it has a general intake flow direction 1 and outflow direction 5 that are both substantially in a radially outward direction centered on an axial centerline of a cylindrical housing (not shown). It will be understood that the flow direction across the filtration apparatus could also be radially inward.

The pleated filter element 210 is formed from a planar filter medium folded into a layered plurality of spaced apart sheets 212. Each sheet 212 is joined to adjacent sheets by an inner fold or pleat 214a and an outer fold or pleat 214b. The sheets 212 and pleats 214a, 214b are configured so that they form a complete circle. The inner pleats 214a define a cylindrical intake boundary 217 of radius $R_I$ across which the intake flow 1 enters the filtration apparatus 200. The outer pleats 214b define a cylindrical exit boundary 217 of radius $R_O$ across which the exit flow 5 exits the filtration apparatus 200. The resulting radial arrangement of filtration element sheets 212 results in V-shaped spaces between the sheets 212, with inward opening spaces (e.g., the space between filtration element sheets 212b and 212c) having a slightly different geometry from outward opening spaces (e.g., the space between filtration element sheets 212a and 212b).

The filtration apparatus 200 comprises a first plurality of reinforcement elements 230 that are configured to be positioned within the inward opening spaces of the filtration element 210 and a second plurality of reinforcing elements 240 that are configured to be positioned within the outward opening spaces of the filtration element 210. Collectively, the reinforcement elements serve to reinforce and maintain the geometry and spacing of the filter media sheets 212. The reinforcement elements 230, 240 are corrugated sheet-like structures similar to those discussed in relation to the previous embodiments. The corrugated structures are provided with apertures that collectively define an open area that allows a fluid to flow through the elements 230, 240. The size, shape and number of apertures may vary depending on the desired porosity and the material and configuration of the reinforcement element 230, 240. In the illustrated embodiment, the reinforcement elements 230, 240 respectively comprise first and second mesh materials 236, 246. It will be understood that the materials and porosity of the inward reinforcement elements 230 can be different from those of the outward reinforcement elements 240. The reinforcement elements 230, 240 are respectively provided with edge guards 239, 249 that are substantially similar to those previously described.

Each corrugated reinforcement element 230 of the invention has regularly spaced and sized ridges 232 on both sides of a center plane 231 through the element 230. As illustrated by a comparison of FIGS. 9 and 10, the ridges 232 have a height $H_I$ that decreases from a maximum at the inner end of the element 230 to a minimum at the outer end. The apexes of the ridges 232 on one side of the element 230 define a first contact plane 251 that is substantially parallel to the filter sheet 212b and the apexes of the ridges 232 on the other side define a second contact plane 253 that is substantially parallel to the filter sheet 212c. The relative angle between the first and second contact planes 251, 253 is representative of the effective taper of the reinforcement element 230.

Each corrugated reinforcement element 240 of the invention has regularly spaced and sized ridges 242 on both sides of a center plane 241 through the element 240. As illustrated by a comparison of FIGS. 9 and 10, the ridges 242 have a height $H_O$ that decreases from a maximum at the outer end of the element 240 to a minimum at the inner end. The apexes of the ridges 242 on one side of the element 240 define a first contact plane 255 that is substantially parallel to the filter sheet 212a and the apexes of the ridges 242 on the other side define a second contact plane 257 that is substantially parallel to the filter sheet 212b. The relative angle between the first and second contact planes 255, 257 is representative of the effective taper of the reinforcement element 240.

It will be understood that in some applications, it may not be necessary to include inner reinforcement elements 230. In other applications, it may not be necessary to include outer reinforcements 240. There may also be applications in which some fraction of the inner or outer facing spaces between sheets 212 may be left open (i.e., unreinforced).

The materials for the filtration element 210 and the reinforcement elements 230, 240 may be selected from any of those previously described.

It will be recognized by those of skill in the art that the porosity of the reinforcement elements 230, 240 allows, not only radial flow through and around the filter element 210, but also circumferential flow, which has the effect of increasing flow through the filter element sheets 212.

The filtration apparatus of the invention may be sized and configured for use in any filtration application. The apparatus may be provided as part of permanent or semi-permanent filter product or may be provided as a cartridge for replaceable installation within a permanent filter unit. Further, it will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A filtration apparatus comprising:
   a filtration element comprising a plurality of planar, spaced apart filtration media sheets; and
   at least one reinforcement element positioned intermediate adjacent filtration media sheets and comprising a reinforcement element body formed from a planar member having a plurality of apertures to allow passage of fluid therethrough, at least a portion of a first surface of the at least one reinforcement element being in contact with a first sheet of the adjacent filtration media sheets and defining a first contact plane parallel to the first sheet and at least a portion of a second surface of the at least one reinforcement element being in contact with a second sheet of the adjacent filtration media sheets and defining a second contact plane parallel to the second sheet,
   wherein the filtration element comprises a single filtration element body pleated to form the plurality of planar, spaced apart filtration media sheets, each pair of adjacent filtration media sheets being integrally connected by a pleat at alternating ends of said media sheets, a first plurality of pleats defining a fluid intake boundary and a second plurality of pleats defining a fluid exit boundary, and
   wherein the reinforcement element body is corrugated by a plurality of ridges alternately extending in opposite directions from a reinforcement element centerplane, said plurality of ridges defining flow channels therebetween, each flow channel being substantially parallel to a line extending from the fluid intake boundary to the fluid exit boundary.

2. A filtration apparatus according to claim 1 wherein the at least one reinforcement element has a porosity in a range of 40% to 70%.

3. A filtration apparatus according to claim 1 wherein the at least one reinforcement element has a porosity in a range of 50% to 60%.

4. A filtration apparatus according to claim 1 wherein
   a first portion of the plurality of parallel ridges extends away from the reinforcement element centerplane in a first direction and a second portion of the plurality of parallel ridges extends from the reinforcement element centerplane in a second direction generally opposite the first direction, each ridge of the first and second plurality of ridges having an apex line, the apex lines of the first portion of ridges collectively defining the first contact plane and the apex lines of the second portion of ridges collectively defining the second contact plane.

5. A filtration apparatus according to claim 4 wherein the first and second contact planes are parallel to one another.

6. A filtration apparatus according to claim 4 wherein the first and second contact planes are at different angles relative to the centerplane, the difference between the angles of the first and second contact planes defining a taper for the reinforcement element body.

7. A filtration apparatus according to claim 1 wherein the reinforcement element body comprises a mesh defining the apertures.

8. A filtration apparatus according to claim 7 wherein the mesh is formed from an array of sintered metal wires.

9. A filtration apparatus according to claim 7 wherein the reinforcement element body comprises an edge guard along a first edge of the mesh adjacent a pleat connecting adjacent filtration media sheets.

10. A filtration apparatus according to claim 9 wherein the reinforcement element body further comprises an edge guard along a second edge of the mesh at an opposite end of the mesh from the first edge.

11. A filtration apparatus according to claim 1 wherein the filtration element body is arranged to form at least a portion of a cylinder having a central cylinder axis and in which arrangement the pleats are parallel to the central cylinder axis, pleats facing toward the central cylinder axis collectively define a first cylindrical flow boundary, and pleats facing away from the central cylinder axis collectively define a second cylindrical flow boundary.

12. A filtration apparatus according to claim 11 wherein the filtration element body is configured so that the first cylindrical flow boundary is the fluid intake boundary and the second cylindrical flow boundary is the fluid exit boundary.

13. A filtration apparatus according to claim 11 wherein the at least one reinforcement element includes at least a first reinforcement element positioned intermediate a first pair of adjacent filtration media sheets having a connecting pleat facing away from the central cylinder axis and a second reinforcement element positioned intermediate a second pair of adjacent filtration media sheets having a connecting pleat facing toward the central cylinder axis.

14. A filter reinforcement element for use in conjunction with a pleated filtration element having a plurality of planar, spaced apart filtration media sheets, each pair of adjacent filtration media sheets being integrally connected by a pleat at alternating ends of said media sheets, a first plurality of pleats defining a fluid intake boundary and a second plurality of pleats defining a fluid exit boundary, the filter reinforcement element comprising:
   a reinforcement element body positionable between adjacent filtration media sheets of the pleated filtration element, the reinforcement element body being formed from a corrugated member having a plurality of apertures formed therethrough, the corrugated member having first parallel ridges extending away from a reinforcement element centerplane in a first direction and alternating second parallel ridges extending away from the reinforcement element centerplane in a second direction generally opposite the first direction, each of the first and second ridges having an apex line, the corrugated member being configured-so that when the reinforcement body is positioned between the adjacent filtration media sheets, the first ridges are in contact with a first sheet of the adjacent filtration media sheets, their apex lines defining a first contact plane parallel to the first sheet and the second ridges are in contact with a second sheet of the adjacent filtration media sheets, their apex lines defining a second contact plane parallel to the second sheet, wherein each pair of first ridges and each pair of second ridges defines a flow channel there-between, each said flow channel being substantially parallel to a line extending from the fluid intake boundary to the fluid exit boundary.

15. A filter reinforcement element according to claim 14 wherein the at least one reinforcement element has a porosity in a range of 50% to 60%.

16. A filter reinforcement element according to claim 14 wherein the first and second contact planes are at different angles relative to the centerplane, the difference between the angles of the first and second contact planes defining a taper for the reinforcement element body.

17. A filter reinforcement element according to claim 14 wherein the reinforcement element body comprises a sintered metal wire mesh defining the apertures.

\* \* \* \* \*